June 3, 1958   R. W. SITLER   2,837,393
KNOCKDOWN CABINET AND METHOD OF ASSEMBLING SAME
Filed Sept. 17, 1954   4 Sheets-Sheet 1
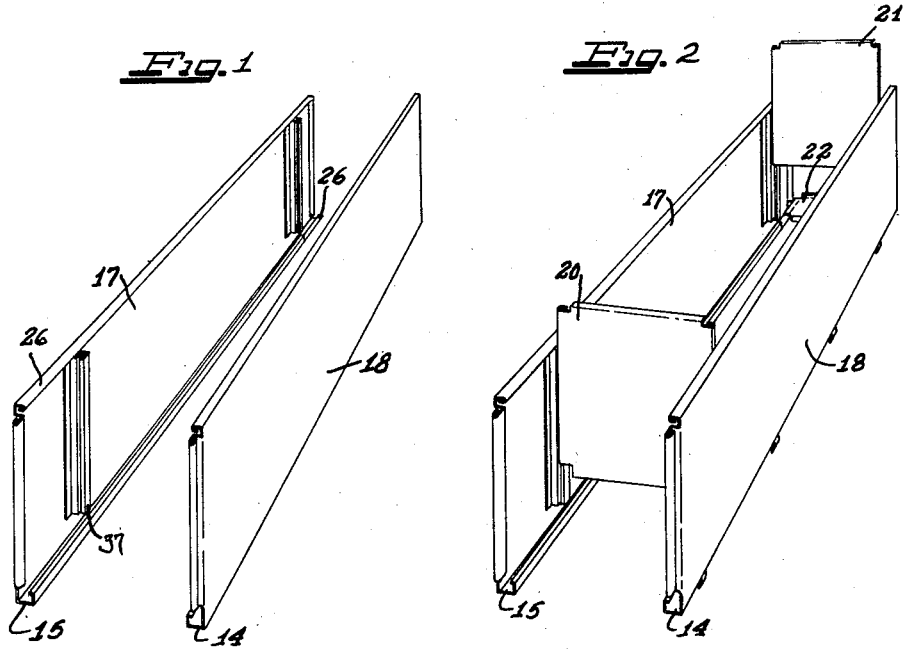
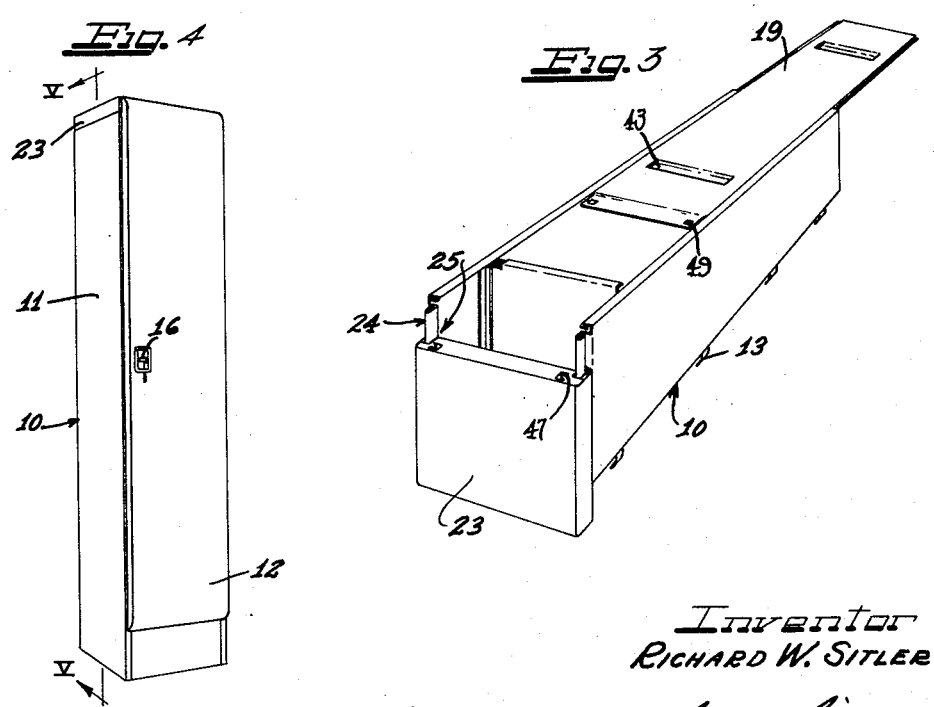
Inventor
RICHARD W. SITLER June 3, 1958 — R. W. SITLER — 2,837,393
KNOCKDOWN CABINET AND METHOD OF ASSEMBLING SAME
Filed Sept. 17, 1954 — 4 Sheets-Sheet 2

Inventor
RICHARD W. SITLER

June 3, 1958  R. W. SITLER  2,837,393
KNOCKDOWN CABINET AND METHOD OF ASSEMBLING SAME
Filed Sept. 17, 1954  4 Sheets-Sheet 3
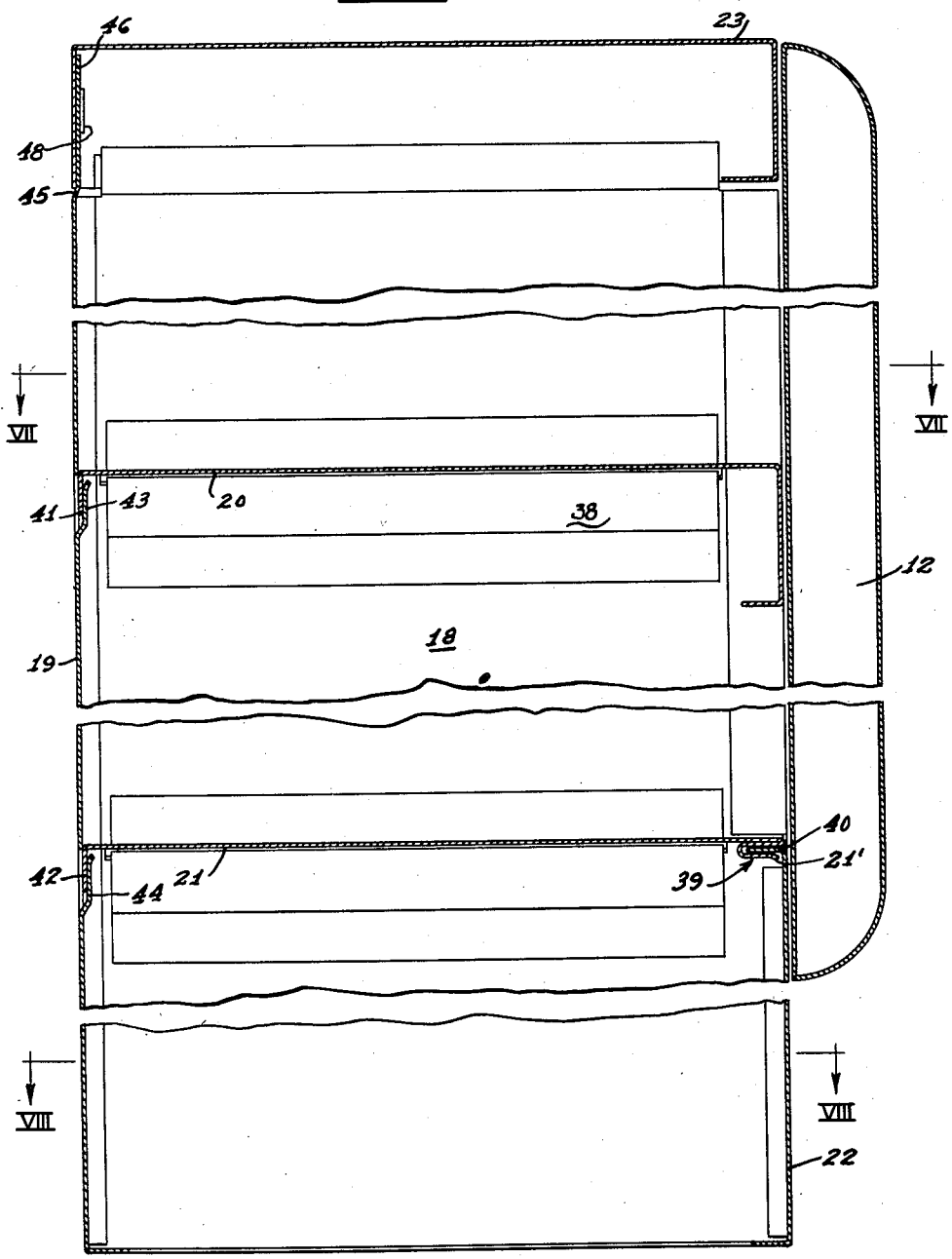
Inventor
RICHARD W. SITLER
by
Attys.

June 3, 1958  R. W. SITLER  2,837,393
KNOCKDOWN CABINET AND METHOD OF ASSEMBLING SAME
Filed Sept. 17, 1954  4 Sheets-Sheet 4
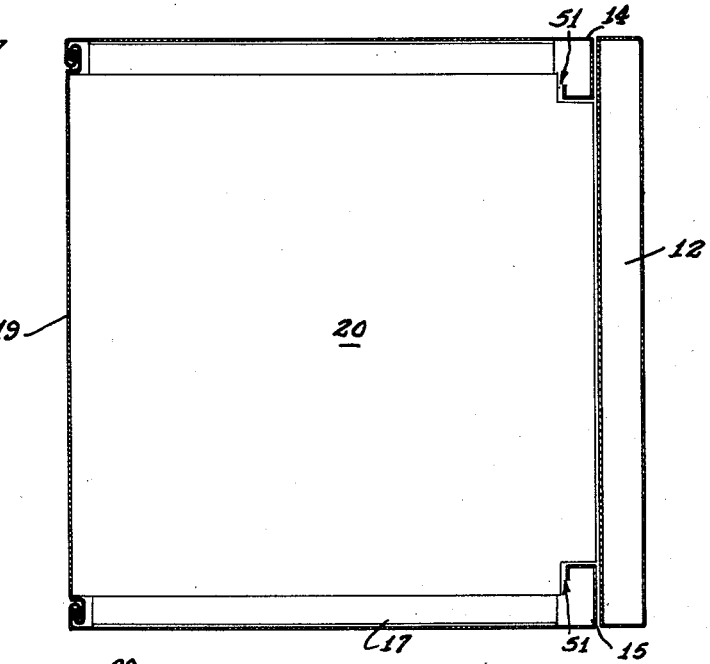
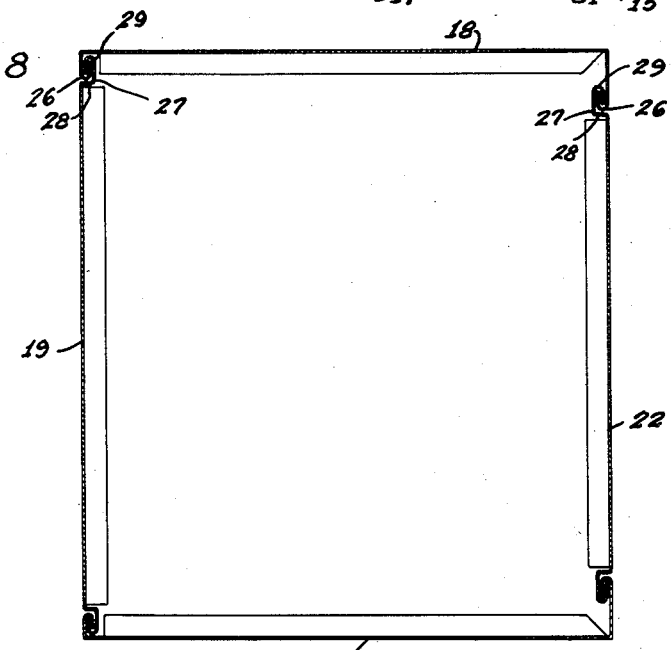
Inventor
RICHARD W. SITLER United States Patent Office 2,837,393
Patented June 3, 1958

2,837,393

KNOCKDOWN CABINET AND METHOD OF ASSEMBLING SAME

Richard W. Sitler, St. Charles, Ill., assignor to Aurora Equipment Company, Aurora, Ill., a corporation of Illinois Application September 17, 1954, Serial No. 456,670

5 Claims. (Cl. 312—257)

This invention relates to a cabinet construction and the method of assembling and dismantling the same.

The principal object of this invention is to provide a locker or cabinet which is so constructed that it may be quickly and easily assembled and dismantled.

In the locker cabinet industry, up to the present time, little or no effort has been made to simplify the construction of a locker in order to minimize the time required in assembling and dismantling the same. It will be appreciated that the known lockers require a considerable number of fasteners and the like and are, therefore, relatively cumbersome to assemble when compared with the instant invention.

The present invention permits each of the locker body elements to be slid into proper relation with respect to the other elements and requires only one fastener passing through the top thereof to hold the rear panel and locker body in unitary relationship. As a result, little or no time is consumed in the assembly of my novel locker.

An additional object of this invention is to provide shelf supporting means which will be readily engageable without the use of time consuming screws and the like.

In accordance with the general features of this invention, there is provided in a method of assembling a knockdown type cabinet, the steps of parallelly aligning a pair of side panels in opposing spaced relationship, sliding transversely interchangeably therewith in order by means of interlocking channels a base, a top and a shelf, sliding longitudinally a back panel connecting same to side panels in a similar manner as aforementioned, and securing said cabinet in unitary relationship by fastening the back panel to one of the members.

Figure 1 illustrates the first step of my novel method, wherein the side panels of the locker are parallelly aligned in spaced relationship;

Figure 2 highlights the second step of my novel method, wherein the upper and lower shelves and the base are slidingly engaged with the side panels;

Figure 3 shows the next step of my invention, wherein the top and rear panels are slidingly engaged with the side panels;

Figure 4 is a perspective view of my novel locker in assembled relationship;

Figure 6 is a fragmentary cross-sectional view, partly in elevation, taken on the line VI—VI of Figure 5;

Figure 7 is a fragmentary cross-sectional view, partly in elevation, taken on the line VII—VII of Figure 6; and Figure 8 is a fragmentary cross-sectional view, partly in elevation, taken on the line VIII—VIII of Figure 6.

As shown on the drawings:

Figure 5:
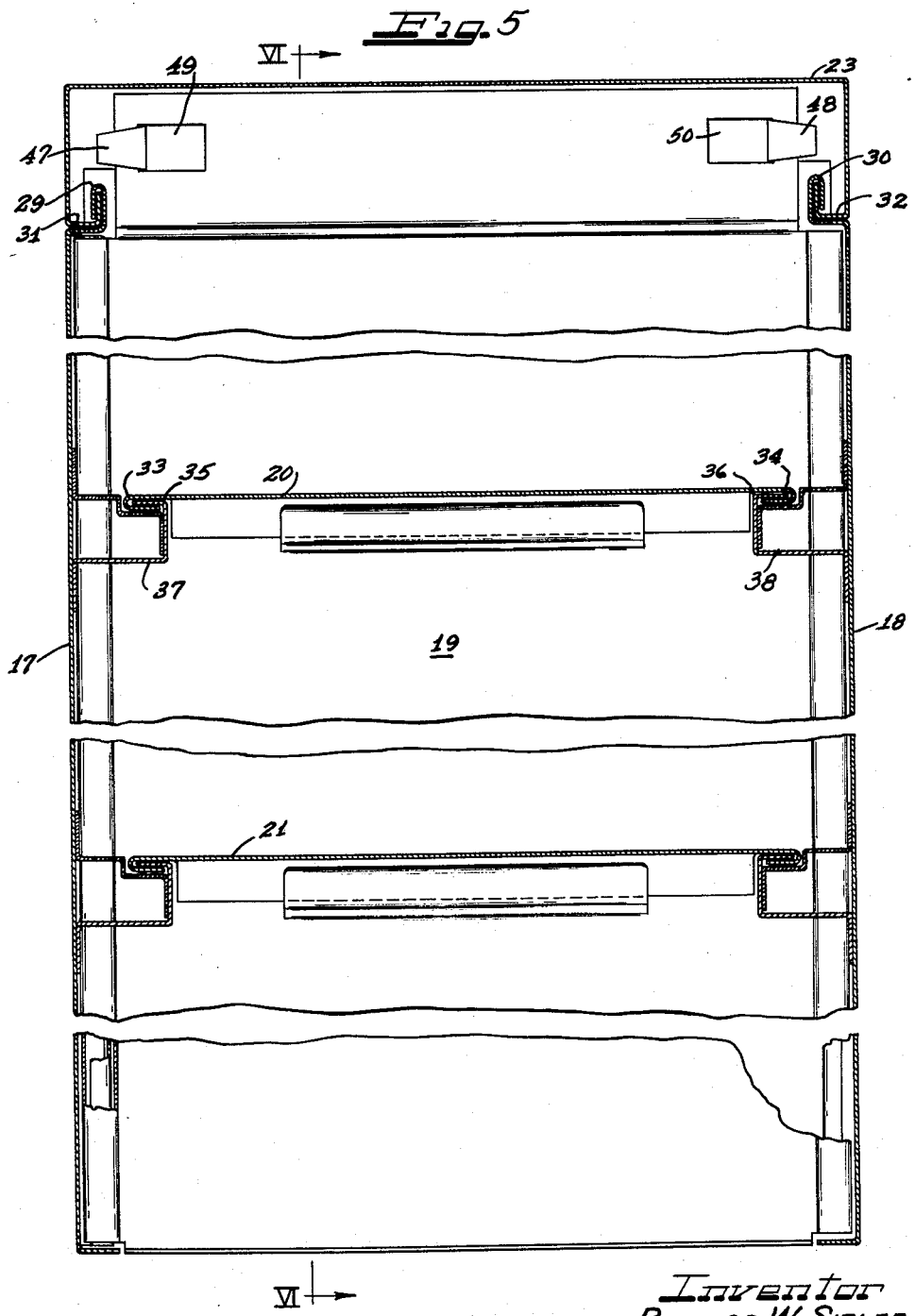
Figure 5 is a fragmentary cross-sectional view, partly in elevation, taken on the line V—V of Figure 4.

The reference character 10 (Figure 4) indicates generally my novel locker or cabinet construction. The locker 10 is comprised of a main cabinet or locker body 11 and a swingable door 12 disclosed and claimed in my copending application Serial No. 446,868, filed July 30, 1954. The door 12 is pivotally secured by hinges 13 (only partly shown but disclosed and claimed in my copending application Serial No. 423,880, filed April 19, 1954) along stepped vertical margin 14, and suitably latchable along the other stepped vertical margin 15, by a handle operated latching unit 16 disclosed and claimed in my copending application Serial No. 418,941 filed March 26, 1954. Since my invention is primarily concerned with the locker body construction and the method of assembly thereof, the following detailed description shall be directed principally thereto.

The locker body 11 is comprised of a pair of side panels 17—18, a rear panel 19, shelves 20—21, a front base panel 22 and a flanged top 23.

Each of the aforesaid elements are secured to another of the elements by means of interengaging channels, indicated generally by the numerals 24 and 25.

The side panels 17 and 18 have on their respective rearward terminal edges, and on their lower front terminal edges, offset channels 26, each having an identical cross-section. Each of the offset channels 26 comprise substantially a U-shaped element with one leg of the U-shaped element integral with the panel (Figure 1).

Rear panel 19 and front base panel 22 each have similarly constructed channels 27 (Figure 8) adapted to be slidingly engaged with channels 26. It will be noted that panels 19 and 22 each have an integral, generally perpendicular flange 28 integrally secured to one leg of U-shaped element 29. Thus, the channels 26 and 27 are securable in interlocking relationship by virtue that the free leg of the U-shaped element will be confined within the opposing channel on the opposite panel.

The top portion or cap 23 (Figure 5) is attachable to the side panels 17 and 18 by virtue that the vertically upper portion of each side panel has located thereon a channel respectively indicated by the numbers 29—30, similar to the aforementioned channels, which are adapted to telescopingly receive the free ends of the underturned spaced channels 31 and 32 on the top 23.

The shelves 21 and 22 are securable to the panels 17—18 by virtue that each of the shelves has underturned channels 33 and 34 on opposite sides of the shelf which are telescopingly cooperable, in interlocking relationship, with channels 35—36 formed on braces or supports 37—38, each of which is suitably secured to one of the side panels.

It will be best seen in Figures 7 and 8 that the shelves 20 and 21 may only be inserted from the rear of the locker since the forward ends of the shelves abut against vertical margins 14 and 15.

In addition, (Figure 6), the bottom shelf 21 is adapted to be interlockingly secured to the front base panel 22 at 39. This is accomplished by reason that the forward end of shelf 21 has an integral underturned U-shaped channel or abutting structure 21' for lapping and securing against movement a leg-like member or extension 40 which is integral with and normal to the base 22. In assembling the locker, it will be understood that the base 22 must be in an assembled position prior to the shelf 21 in order for the two to be properly interlocked.

Additional shelf supporting means have been provided for the rear end of the shelves 20 and 21 so as to insure against any possible collapse of the shelves due to heavy loads. It will be seen in Figure 6 that the shelves 20 and 21 have edge structure in the nature of downwardly extending integral flanges 41 and 42. Respective flanges 41 and 42 are so constructed as to be receivable within respective offset extensions or hooks 43 and 44 formed integral with the rear panel 19.

Figure 6 further shows the rear panel 19 to be offset at 45 adjacent and below the upper terminal end 46. By offsetting the panel 19, end 46 may be guided into underlapping relation with respect to the flanged top 23 so as to firmly position the top with respect to the remainder of the cabinet.

Still further, the flanged top 23 and more particularly the flange at the rear of the top is provided with a pair of deformable tabs 47 and 48. These tabs extend through the openings 49—50 and engage on the rear side of the rear panel 19 (Figure 5), thereby serving to hold the cabinet in unitary relationship. While two tabs have optionally been shown, one or more tabs or fasteners would serve equally as well. In addition, it is understood that the tabs or fastening means could be integral with the rear panel and engageable with any of the other abutting elements.

Figure 7 shows that there is a slight space at 51 between the vertical margins 14 and 15 and the shelf 20, the same being true with reference to shelf 21. In assembling the cabinet, the aforementioned space permits the shelves to be slid forwardly slightly in excess of the respective normal positions so that the rear panel 19 may be slid into its approximate final position without the offset portion 45 and the hook 43 becoming engaged in an improper position relative to the shelves.

The first step in the preferred method of assembling my novel cabinet or locker 10 is to align in spaced relationship the side panels 17 and 18.

Subsequently, the shelves 20 and 21 may be slid into interlocking engagement with the side panels 17 and 18.

Thereafter, base panel 22 is slid into position, but before panel 22 may be slid into final position, shelf 21 must be lifted slightly so as to permit the leg 40 to clear the forward end of the shelf 21. Shelf 21 is then interlocked with base panel 22.

The next step in assembling my locker is the lifting of the top end of the side panels so that the top may be interlockingly slid into final position.

The rear panel 19 is then introduced from the bottom of the locker after the shelves have been pushed as far forward as possible so as to permit the offset portion and hooks to clear the shelves as the rear panel is slid into position just prior to final assemblage. At this point, the shelves 20 and 21 are pushed rearwardly as far as possible, and the back panel 19 is then urged into final position with the hooks 41 and 42, each interlocked with one of the flanges 43 and 44.

The tab or tabs 47 and 48 are then deformed so as to finally position the top 23 relative to the rear panel 19 thereby completing the assembly of the locker body 11.

Finally, the locker door 12 is secured to the locker body 11 by hinges 13.

It will be appreciated that the steps in assembling the locker body 11 might be suitably interchanged as desired. It is crucial however to my method that the rear panel 19 be the last to be slid into position since the rear panel serves to hold the locker body 11 in assembled position. In so doing, a minimum number of screws and the like are required thereby greatly reducing the overall time for assembling and dismantling my locker 10.

In dismantling the locker 10, the best results are obtainable by reversing the foregoing steps.

Relative to my novel method, it should be understood that the conventional base might be employed as opposed to my preferred bottom shelf and base panel construction. In so doing, the conventional base panel could be provided with suitable channels such as previously described, so as to be interlocked with the bottom of the cabinet and thereafter be held in unitary relation by rear panel 19 as is done in the preferred form.

It will be understood that modifications and variations may be effected without departing from the scope of the novel concepts of the present invention.

I claim as my invention:

1. In a knock-down cabinet construction, a pair of coextensive elongated panels in opposed spaced relation having respective longitudinal edge channels, on confronting margins, each of said panels having similar directly opposite transverse channel structure at common spaced locations thereon longitudinally thereof and extending normal to said longitudinal edge channels, short transverse panels of substantially similar width as said elongated panels and having edge channel structure interengageable with said transverse channel structure of the elongated panels by endwise relative sliding assembly movement of said transverse panel edge channel structures and said transverse channel structures, and a third elongated panel having on its longitudinal edges respective channel structures slidably interengageable with the longitudinal channels of the first mentioned panels by relative sliding interengagement from one end of the first mentioned panels, means whereby said third panel retains said pair of elongated and transverse panels against sliding disassembly, and securing structure for fixedly securing said third longitudinal panel against disassembly unless said securing structure is released.

2. The cabinet construction of claim 1 further characterized by one of said transverse panels comprising a flanged end panel with confronting flanges on opposite ends of the end panel with one of the confronting flanges overlapping front edge areas of the elongated panels and with another of the confronting flanges overlapping the third panel whereby assembly and removal of the end panel may be facilitated by sliding an end portion of the third panel into and out of underlying interlocking relation with respect to said another of the confronting flanges.

3. The cabinet structure of claim 1 further characterized by said means including longitudinal door channel structure along front edges of said elongated panels with at least one of said transverse panels being confined in assembly between said longitudinal door channel structure and said third panel with said transverse panels after said at least one of said transverse panels has been moved toward and into assembly with said transverse channel structure and upon the sliding engagement and assembly of the third panel with said elongated panels.

4. The cabinet construction of claim 1 further characterized by a front panel including edge structure with said front panel and said elongated panels being provided with front inter-engageable channel structure enabling the front panel to be moved longitudinally into and out of assembly with respect to said elongated panels and with one of said transverse panels having abutting structure lapping said edge structure securing said front panel against disassembly.

5. The cabinet construction of claim 1 further characterized by at least one of said transverse panels having edge structure and with said third panel having an offset extension engaged with said edge structure to lock said at least one transverse panel into assembly.

References Cited in the file of this patent

UNITED STATES PATENTS

| 759,728 | Maxwell | May 10, 1904 |
| 1,162,798 | Morton | Dec. 7, 1915 |
| 1,238,215 | Terrell | Aug. 28, 1917 |
| 1,573,254 | Lachaine | Feb. 16, 1926 |
| 1,729,268 | Henderson | Sept. 24, 1929 |
| 1,805,019 | Smiley | May 12, 1931 |
| 2,346,982 | Mastrangelo | Apr. 18, 1944 |
| 2,443,515 | Rockwell | June 15, 1948 |
| 2,571,622 | Schmidt | Oct. 16, 1951 |
| 2,591,172 | Lundine | Apr. 1, 1952 |